(12) United States Patent
Zeh et al.

(10) Patent No.: US 11,165,794 B2
(45) Date of Patent: Nov. 2, 2021

(54) ALERT SYSTEM FOR CONTROLLER AREA NETWORKS

(71) Applicant: Infineon Technologies AG, Neubiberg (DE)

(72) Inventors: Alexander Zeh, Munich (DE); Karel Heurtefeux, Munich (DE)

(73) Assignee: Infineon Technologies AG, Neubiberg (DE)

( * ) Notice: Subject to any disclaimer, the term of this patent is extended or adjusted under 35 U.S.C. 154(b) by 210 days.

(21) Appl. No.: 16/588,528

(22) Filed: Sep. 30, 2019

(65) Prior Publication Data

US 2021/0099469 A1 Apr. 1, 2021

(51) Int. Cl.
*G06F 21/00* (2013.01)
*H04L 29/06* (2006.01)
*H04L 9/08* (2006.01)
*H04L 29/12* (2006.01)

(52) U.S. Cl.
CPC .......... *H04L 63/1416* (2013.01); *H04L 9/085* (2013.01); *H04L 9/0894* (2013.01); *H04L 29/12849* (2013.01)

(58) Field of Classification Search
None
See application file for complete search history.

(56) References Cited

U.S. PATENT DOCUMENTS

| | | | | |
|---|---|---|---|---|
| 9,902,370 B2 * | 2/2018 | Haga | ................. | H04L 9/0891 |
| 10,187,406 B2 * | 1/2019 | Maeda | ................. | H04L 12/28 |
| 10,369,942 B2 * | 8/2019 | Ben Noon | ............... | G06F 21/55 |
| 2003/0131657 A1 * | 7/2003 | Anderson | ............ | B60C 23/0408 340/442 |
| 2010/0150176 A1 * | 6/2010 | Yakashiro | ......... | H04L 12/40163 370/475 |
| 2015/0220401 A1 * | 8/2015 | Jiang | ................... | G06F 11/1441 714/23 |
| 2020/0213351 A1 * | 7/2020 | Shin | ........................ | H04L 12/40 |

OTHER PUBLICATIONS

National Institute of Standards and Technology, "Announcing the Advanced Encryption Standard (AES)", Nov. 26, 2001, 51 pages.
International Organization for Standardization, "Road vehicles—Controller area network (CAN)", Dec. 1, 2003, 52 pages.
(Continued)

*Primary Examiner* — Maung T Lwin
(74) *Attorney, Agent, or Firm* — Harrity & Harrity, LLP

(57) ABSTRACT

A sender device may include a transmitter and one or more processors. The one or more processors may be configured to transmit, to one or more receiver devices, a frame via a communication bus. The one or more processors may be configured to detect a replicated frame on the communication bus, and identify an attack event based on detecting the replicated frame. The one or more processors may be configured to determine a sequence of interframe transmit times based on identifying the attack event, wherein the sequence of interframe transmit times is determined based on a shared secret associated with the one or more receiver devices. The one or more processors may be configured to transmit a series of alert frames according to the sequence of interframe transmit times to permit the one or more receiver devices to be notified of the attack event.

20 Claims, 10 Drawing Sheets

(56) References Cited

OTHER PUBLICATIONS

Autosar, "Specification of Secure On board Communication", Dec. 8, 2017, 150 pages.
Wikipedia, "ISO 26262", https://en.wikipedia.org/w/index.php?title=ISO_26262&oldid=916374540, Sep. 18, 2019, 7 pages.
CAN in Automation (CiA), "SIG CAN XL", https://www.can-cia.org/groups/technical-groups/technical-committee-tc/ig-layer-12/sig-can-xl/, Dec. 12, 2017, 1 page.
Alexander Apostolov et al., "Standard profile for use of IEEE std 1588-2008 precision time protocal (PTP) in power system applications", Apr. 2013, 16 pages.
Eyal Itkin et al., "A Security Analysis and Revised Security Extension for the Precision Time Protocol", May 28, 2016, 27 pages.

* cited by examiner

ALERT SYSTEM FOR CONTROLLER AREA NETWORKS

BACKGROUND

A Controller Area Network (CAN) is a network of one or more communication buses that interconnect nodes of a particular system. An individual node can include a sensor, an actuator, a controller, and/or another device that is used by the system to perform a function. In a vehicle system, a node can correspond to a sensor, an actuator, and/or an Electronic Control Unit (ECU) (e.g., an Engine Control Module (ECM), a Powertrain Control Module (PCM), a Transmission Control Module (TCM), a Brake Control Module (BCM), a Central Control Module (CCM), a Central Timing Module (CTM), a General Electronic Module (GEM), a Body Control Module (BCM), a Suspension Control Module (SCM), and/or the like) that is associated with a function of a vehicle. Nodes within a CAN communicate with one another via the CAN bus using string of bits, or frames, that are serially transmitted and/or received according to a message-based communication protocol. Although a CAN bus is often used in vehicles (e.g., road vehicles, off-road vehicles, marine vehicles, aerial vehicles, and/or the like), a CAN bus can also be used for other applications (e.g., industrial systems, medical systems, robotics systems, and/or the like).

SUMMARY

According to some implementations, a method may include transmitting, by a sender device and to one or more receiver devices, a frame via a CAN bus, wherein the frame includes an identifier field and a payload field; detecting, by the sender device and after transmitting the frame, a replicated frame on the CAN bus, wherein the replicated frame includes one or more of the identifier field or the payload field of the frame; identifying, by the sender device, an attack event based on the replicated frame; and transmitting, by the sender device, and based on identifying the attack event, a series of alert frames, which are transmitted according to a sequence of interframe transmit times determined based on a shared secret associated with the sender device, wherein transmitting the series of alert frames permits the one or more receiver devices to be notified of the attack event based on the sequence of interframe transmit times.

According to some implementations, a sender device may include a transmitter and one or more processors configured to transmit, to one or more receiver devices and using the transmitter, a frame via a communication bus, wherein the frame includes an identifier field and a payload field; detect a replicated frame on the communication bus, wherein the replicated frame includes one or more of the identifier field or the payload field of the frame; identify an attack event based on detecting the replicated frame; determine a sequence of interframe transmit times based on identifying the attack event, wherein the sequence of interframe transmit times is determined based on a shared secret associated with the one or more receiver devices; and transmit, using the transmitter, a series of alert frames according to the sequence of interframe transmit times to permit the one or more receiver devices to be notified of the attack event based on the series of alert frames transmitted according to the sequence of interframe transmit times.

According to some implementations, a receiver device may include a receiver and one or more processors configured to receive, from a sender device and using the receiver, a series of alert frames via a communication bus, wherein the alert frames are received at respective arrival times; determine interframe arrival times associated with the series of alert frames based on the respective arrival times; evaluate a shared secret associated with the sender device, wherein the shared secret includes information relating to a reference sequence of interframe arrival times, and wherein the reference sequence of interframe arrival times corresponds to an attack event detected by the sender device; identify a notification of the attack event based on determining that the interframe arrival times correspond to the reference sequence of interframe arrival times; and cause an action to be performed in connection with the attack event.

DETAILED DESCRIPTION

Figure 1:
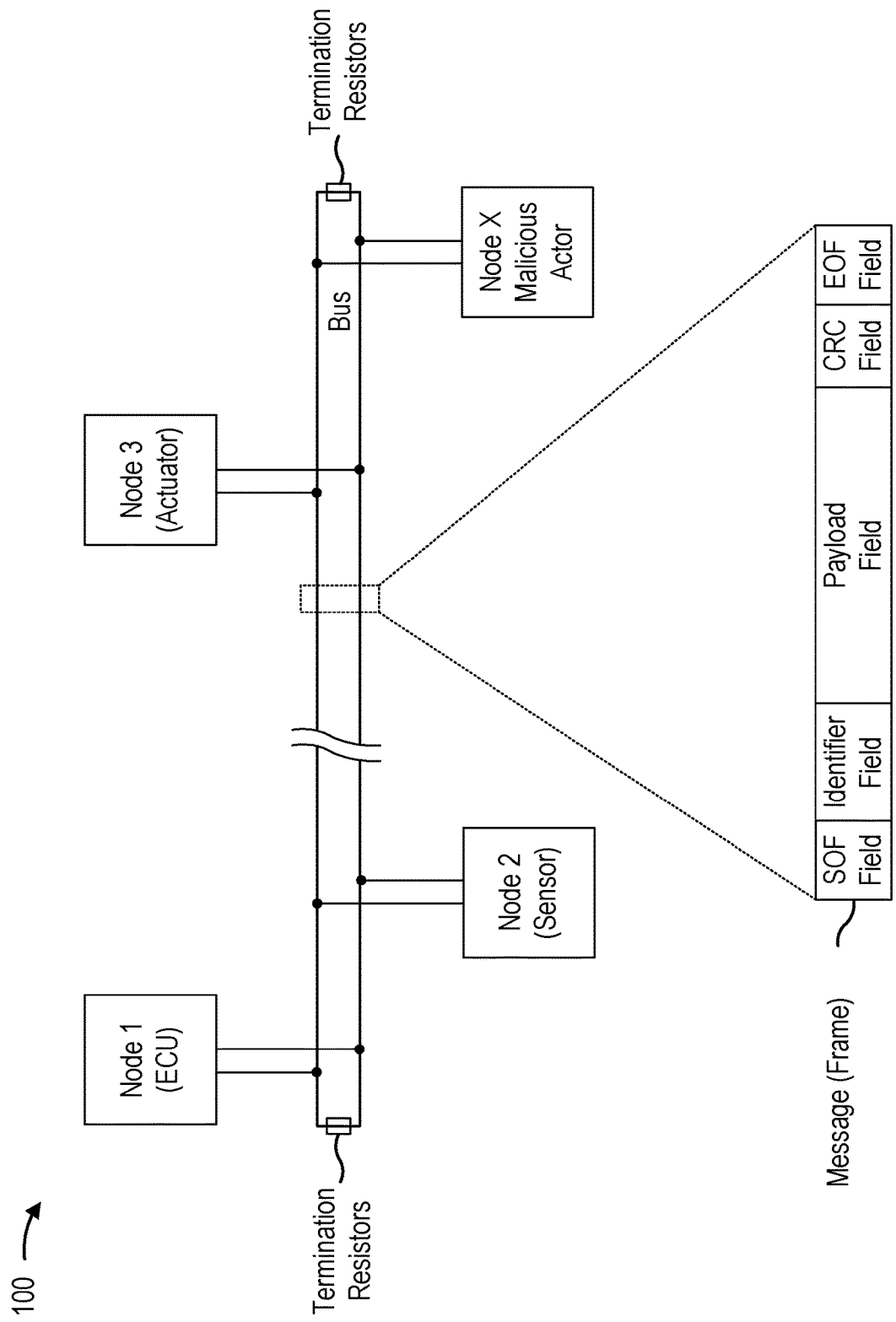
FIG. 1 is a diagram of an example environment in which systems and/or methods, described herein, may be implemented.

The following detailed description of example implementations refers to the accompanying drawings. The same reference numbers in different drawings may identify the same or similar elements.

As described above, a CAN may include a network of one or more communication buses that interconnect nodes of a system (e.g., a vehicle system, an industrial system, a medical system, a robotics system, and/or the like). A node may include a sensor, an actuator, a controller, and/or another device that is used to perform a function of the associated system. In a vehicle, for instance, a node may correspond to a sensor, an actuator, and/or an ECU that is associated with a throttle function, a steering function, a braking function, a gear selection function, and/or another function of the vehicle. A node may communicate with other nodes on a CAN bus via frames (e.g., strings of bits) that are serially transmitted and/or received according to a message-based communication protocol. For example, a node may transmit a frame of dominant and/or recessive bits that can be interpreted by another node as information provided via a sensor, information for controlling an actuator, an operating parameter, an operating condition, and/or the like. According to the communication protocol, a frame having higher priority (e.g., with dominant leading bits) may be transmitted before a frame having lower priority (e.g., with recessive leading bits). Nodes of a CAN bus may be provided in a multi-master arrangement in which information that is transmitted via the CAN bus is available to any connected node seeking the information.

Increasingly more systems (e.g., vehicle systems) rely on electrical controls rather than mechanical controls to operate, which leads to an increased reliance on CAN buses to support information relating to time-sensitive and critical functions (e.g., information relating to throttle functions, steering functions, braking functions, gear selection functions, and/or the like). Furthermore, increasingly more systems provide network connectivity and/or include semi-autonomous and/or autonomous functions. Such combinations of factors may raise challenges in terms of maintaining security and/or integrity of the information exchanged via a CAN bus. In some cases, such as in vehicle systems, a compromised CAN bus may lead to potential safety concerns. For instance, a malicious actor may compromise an existing node of a CAN bus of a vehicle or introduce an unauthorized node to the CAN bus in an attempt to override or otherwise disrupt a potentially critical function of the vehicle. Due to the multi-master arrangement of a CAN bus, a malicious actor that is connected to the CAN bus may be able to observe messages being transmitted via the CAN bus undetected, introduce bits (e.g., dominant bits) at inappropriate times to modify and/or corrupt transmitted messages, and/or initiate an attack (e.g., a delay attack, a replay attack, an impersonation attack, a spoofing attack, and/or the like).

In a delay attack, a malicious actor may corrupt an otherwise valid message (e.g., a message used for clock synchronization and/or another type of message) in a manner that introduces an unwanted delay or otherwise disrupts a time-sensitive operation of the CAN bus. In a replay attack, a malicious actor may replicate a message (e.g., a message used for clock synchronization and/or another type of message) that was previously transmitted by a node of the CAN bus, and transmit the replicated message to disrupt an operation of the CAN bus. In an impersonation attack, a malicious actor may replicate a message that was previously transmitted by a node, and transmit the replicated message falsely identifying the node as the sender to disrupt an operation managed by a CAN bus. In a spoofing attack, a malicious actor may fabricate a message that falsely identifies a node of the CAN bus as the sender, and transmit the fabricated message to disrupt an operation of the CAN bus. In some cases, a malicious actor may initiate an attack that is a combination of a delay attack, a replay attack, an impersonation attack, a spoofing attack, and/or another type of malicious attack. Due to the time-sensitive and/or critical nature of some of the functions supported by a CAN bus and susceptibility to such malicious attacks, these malicious attacks may disrupt operations, waste resources, and cause undesirable outcomes.

Some implementations described herein provide an alert system that can identify an attack event within a CAN bus and facilitate corrective measures to address the attack event in an efficient manner. For example, the alert system may enable a sender node to detect a replicated frame via the CAN bus (e.g., a replication of a valid frame that was previously transmitted by the sender node and replicated by a malicious actor), identify an attack event based on the replicated frame, and transmit a series of alert frames to notify one or more receiver nodes of the CAN bus of the alert event. The sender node may transmit the alert frames according to a sequence of interframe transmit times that is determined based on a shared secret associated with the sender node and/or the one or more receiver nodes. Correspondingly, the alert system may enable a receiver node to receive the series of alert frames, determine interframe arrival times associated with the series of alert frames, evaluate the shared secret including information relating to a reference sequence of interframe arrival times, and receive a notification relating to the attack event based on determining that the interframe arrival times correspond to the reference sequence of interframe arrival times. In some examples, the alert system may enable the sender node and/or the receiver node to cause an action to be performed in connection with the attack event (e.g., to curtail, circumvent, and/or otherwise address the attack event).

In this way, the alert system may minimize disruptions to CAN-based operations caused by a malicious actor. For example, the alert system promptly notifies nodes within a CAN bus of an identified attack event by broadcasting alert messages according to a secret sequence of interframe times that is shared between nodes of the CAN bus. By securing the alert messages in terms of interframe times rather than by message content alone, the alert system limits an ability of a malicious actor to interpret, disrupt, and/or compromise the alert messages. Also, by promptly notifying nodes of an identified attack event, the alert system enables a CAN-based system to quickly implement corrective measures to curtail, circumvent, and/or otherwise address the attack event. The alert system thereby aids in further limiting disruption and/or damage that may be caused by a malicious actor. In a vehicle system, for instance, the alert system may minimize disruption to throttle functions, steering functions, braking functions, gear selection functions, and/or other time-sensitive and/or critical functions. Furthermore, the alert system may operate at a data link layer of a CAN which operates closer to a physical layer of the CAN (e.g., according to an Open System Interconnection (OSI) seven-layer model) to enable quicker detection of and/or response to an attack event relative to other solutions that may operate at an application layer.

FIG. 1 is a diagram of an example environment 100 in which systems and/or methods, described herein, may be implemented. As shown in FIG. 1, environment 100 may correspond to a CAN having a node, a communication bus (e.g., a CAN bus), and a termination resistor. A node (e.g. Node 1, Node 2, or Node 3) may include a sensor, an actuator, and/or a controller of an associated system that is configured to perform a function of the associated system. In a vehicle system, for example, a node may correspond to a sensor, an actuator, and/or an ECU associated with a throttle function, a steering function, a braking function, a gear selection function, and/or another function for operating a vehicle. As shown for the example in FIG. 1, the communication bus may include two bus terminals (e.g., a high bus terminal and a low bus terminal). A node may selectively apply a direct current (DC) voltage signal across the bus terminals to transmit a dominant bit or a recessive bit. For example, a node may transmit a dominant bit (e.g., a logical "0" bit) by driving the high bus terminal to a high voltage (e.g., 5 VDC) and by driving the low bus terminal to a low voltage (e.g., 0 VDC), and transmit a recessive bit (e.g., a logical "1" bit) by driving neither bus terminal. The bus terminals may extend between the nodes and enable information (e.g., information provided via a sensor, information for controlling an actuator, an operating parameter, an operating condition, and/or the like) to be exchanged between the nodes. A termination resistor may include an electrical resistor configured to limit a signal reflection between nodes.

In some implementations, the communication bus may correspond to a communication bus of another type of network (e.g., a Controller Area Network with Flexible Data Rate (CAN FD), a Controller Area Network Extra Large (CAN XL), a CANopen, a Local Interconnect Network (LIN), a FlexRay network, an Ethernet network, and/or the like). Although shown with two bus terminals, the communication bus may interconnect the nodes using a different number of bus terminals and/or using a different arrangement of bus terminals that interconnect a different arrangement of nodes. In some examples, the communication bus may be provided in a multi-master arrangement in which information transmitted via the communication bus is available to any node that is connected to the communication bus. In some examples, the communication bus may be arranged in a form of a ring topology (e.g., in which ends of the communication bus are electrically coupled to a single master unit). Additionally, or alternatively, the communication bus may be comprised of a plurality of communication buses and/or in selective communication with one or more additional communication buses. Although a CAN bus is often used in vehicles (e.g., road vehicles, off-road vehicles, marine vehicles, aerial vehicles, and/or the like), a CAN bus may also be used in other applications (e.g., industrial systems, medical systems, robotics systems, and/or the like).

In some implementations, the nodes of a communication bus may communicate with one another according to a message-based communication protocol. For example, a sender node may transmit a message as a frame of bits that are serially introduced into the communication bus and serially received by a receiver node of the communication bus. A frame may generally include one or more designated fields that provide different types of information relating to the message contained in the frame. As shown for the example in FIG. 1, a frame may include a start-of-frame (SOF) field, an identifier field, a payload field, a cyclic redundancy check (CRC) field, an end-of-frame (EOF) field, and/or the like. The SOF field may include one or more bits designating a start of a new message. The identifier field may include one or more bits identifying a priority of the frame, a type of content contained in the frame, a unique identifier of a sender node, a unique identifier of a receiver node, and/or other information that can be used by a receiver node to identify the intended recipient of the message. The payload field may include one or more bits relating to the underlying content of the message. The CRC field may include one or more bits configured to enable a receiver node to determine consistency between the received message and the transmitted message. The EOF field may include one or more bits designating an end of the message. In some examples, a frame may include additional fields, fewer fields, and/or a different arrangement of fields than shown.

In some implementations, the communication bus may be subject to an attack initiated by a malicious actor (e.g., Node X). For instance, a malicious actor may compromise an existing node of the communication bus or introduce an unauthorized node to the communication bus in an attempt to override or otherwise disrupt a function of the associated system (e.g., a vehicle system and/or the like). As described above, a malicious actor that gains access to the communication bus may be able to observe messages being exchanged via the communication bus undetected. In some cases, a malicious actor may not operate according to a communication protocol of the communication bus and introduce bits at inappropriate times (e.g., during transmission of other messages). The malicious actor may thereby corrupt otherwise valid messages, disrupt timing of messages, offset clock synchronization between nodes, congest the communication bus, invoke a denial of service, and/or otherwise disrupt an operation of one or more nodes connected to the communication bus. In some examples, the malicious actor may initiate a delay attack, a replay attack, an impersonation attack, a spoofing attack, and/or a combination thereof, as described above. In a vehicle, a malicious attack may cause disruption to time-sensitive and/or critical vehicle functions (e.g., throttle functions, steering functions, braking functions, gear selection functions, and/or another function of the vehicle).

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2A:
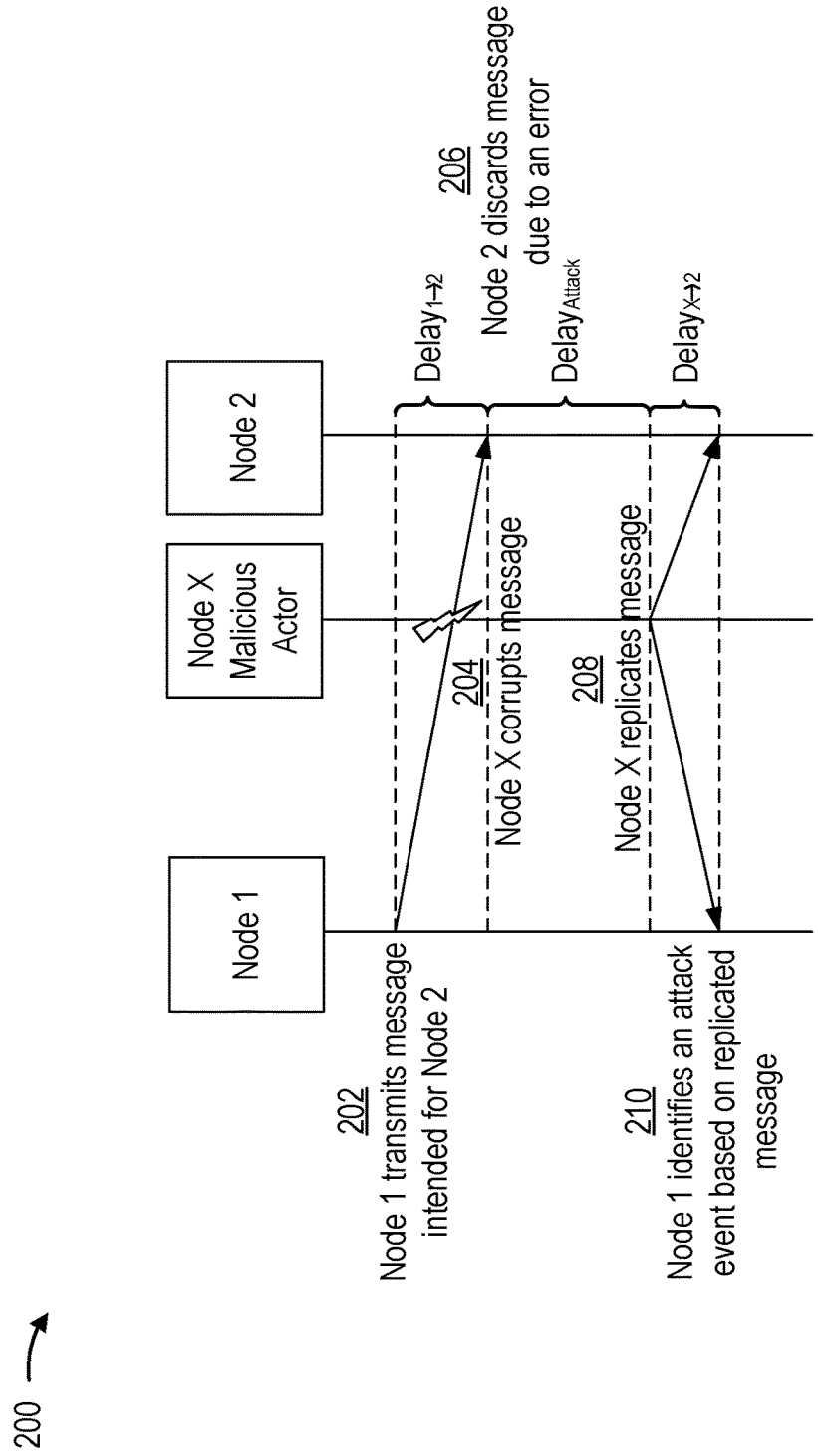
FIGS. 2A-2C are diagrams of an example implementation of an alert system described herein.
Figure 2B:
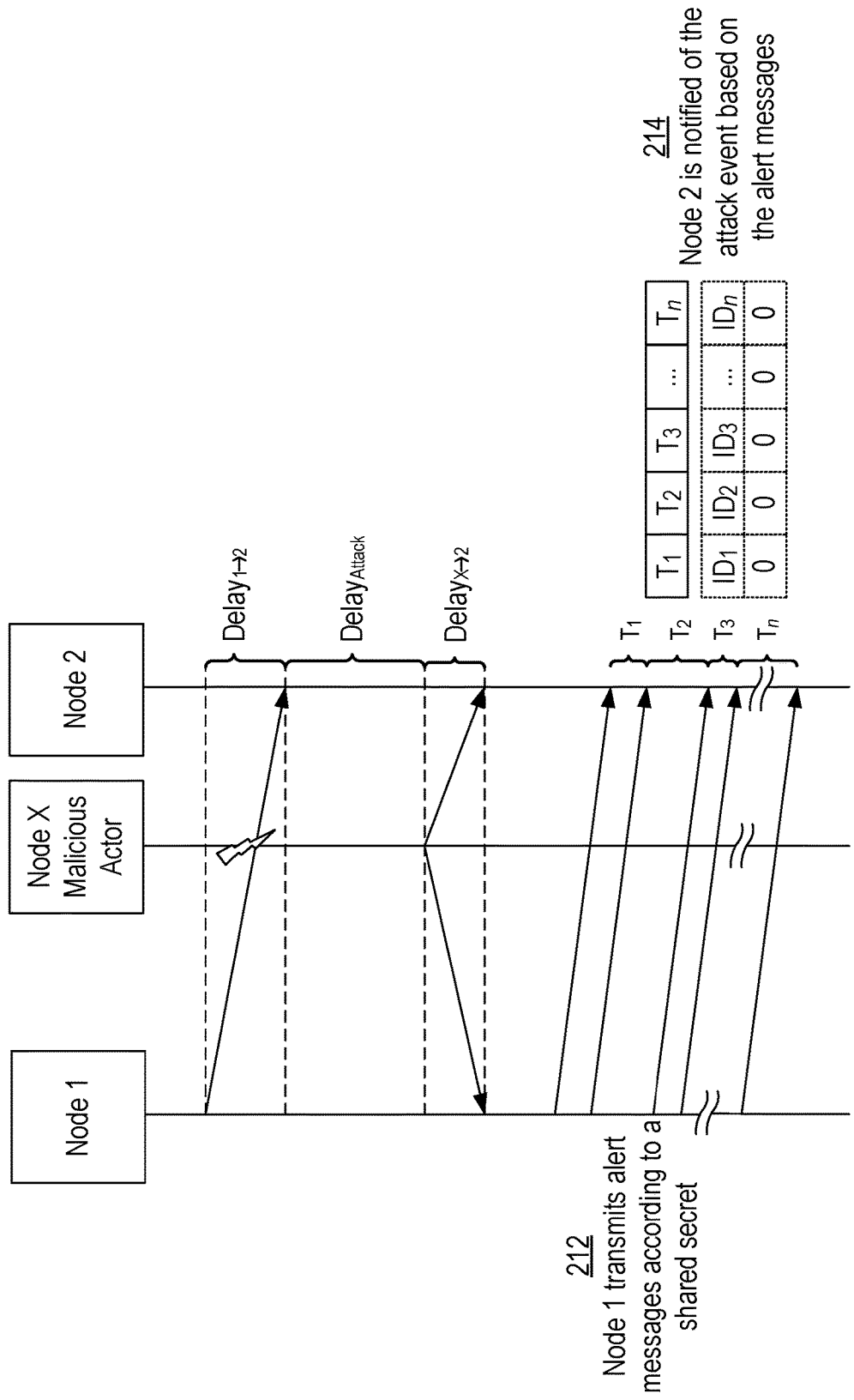
Figure 2C:
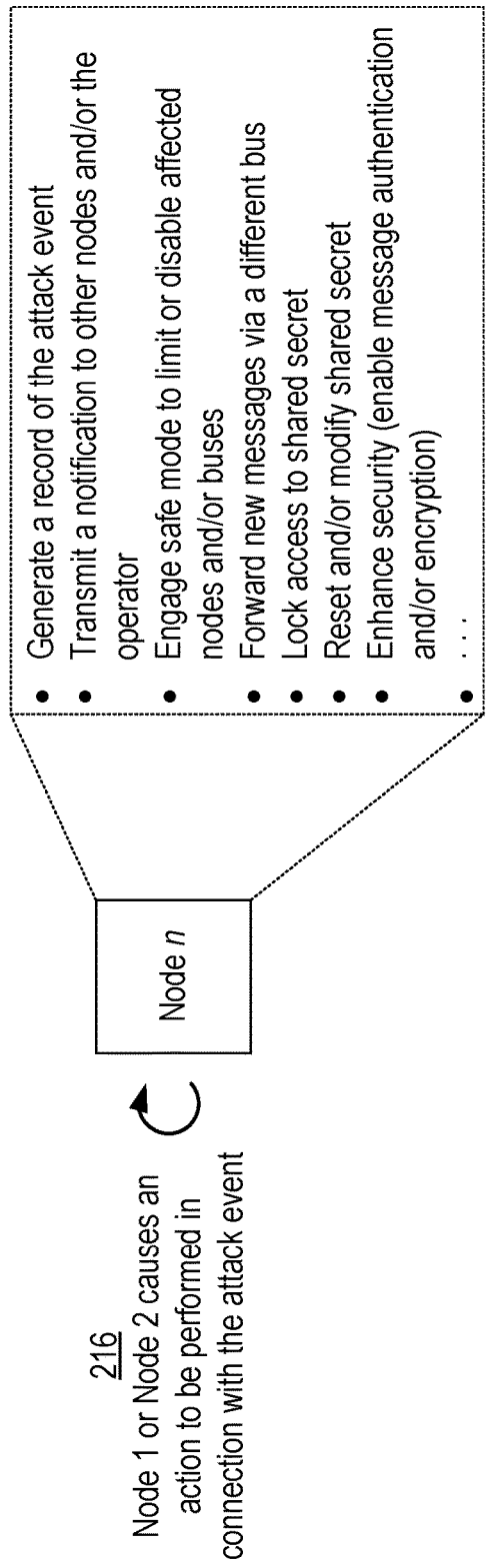

FIGS. 2A-2C are diagrams of an example implementation 200 of an alert system described herein. As shown in FIGS. 2A-2C, the example implementation(s) 200 may include a first node (e.g., Node 1) and a second node (e.g., Node 2) that are interconnected via a communication bus (e.g., a CAN bus). FIGS. 2A-2C present one or more functions that may be performed by the first node and/or the second node to identify an attack event initiated by a malicious actor (e.g., Node X) connected to the communication bus, and cause an action to curtail, circumvent, and/or otherwise address the attack event. In some examples, the first node and/or the second node may include a sensor, an actuator, a controller, and/or another device of an associated system. For example, the first node and/or the second node may perform an operation associated with a throttle function, a steering function, a braking function, a gear selection function, and/or another function of a vehicle system. In some examples, the first node and/or the second node may perform an operation associated with an industrial system, a medical system, a robotics system, and/or another CAN-based system. One or more of the functions, described as being performed by the first node, may be performed by the second node and/or another node of the communication bus, and one or more of the functions, described as being performed by the second node, may be performed by the first node and/or another node of the communication bus.

As shown in FIG. 2A, and by reference number 202, the first node may transmit a message (e.g., a frame of bits corresponding to the message) intended for the second node via the communication bus. In some examples, the message may be used to perform one-way clock synchronization with the second node. The first node may transmit a frame having an identifier field with information identifying the first node and a payload field with information identifying a transmit time and/or a timestamp of the frame. For example, the payload field may include information that can be used by the second node to determine a transmission delay (e.g., $Delay_{1 \rightarrow 2}$) between the first node and the second node, and synchronize an internal clock of the second node based on the transmission delay. In some examples, the message may relate to other types of information (e.g., information relating to a throttle function, a steering function, a braking function, a gear selection function, and/or another function of a vehicle system). In such cases, the corresponding frame may include an identifier field with information identifying the first node and the payload field with information identifying content (e.g., information provided via a sensor, information for controlling an actuator, an operating parameter, an operating condition, and/or the like).

As further shown in FIG. 2A, and by reference number 204, a malicious actor may corrupt the message transmitted by the first node and intended for the second node. For example, the malicious actor may gain control of an existing node of the communication bus or introduce an unauthorized node to the communication bus to gain access to messages being exchanged within the communication bus. Once connected to the communication bus, the malicious actor may attempt to override or otherwise disrupt an operation associated with the first node and/or the second node. For example, during transmission of the frame (e.g., at a time that a node of the communication bus would not transmit bits per communication protocol), the malicious actor may introduce a dominant bit (e.g., a logical "0") into the communication bus (e.g., by driving a high bus terminal to 5 VDC and driving a low bus terminal to 0 VDC). By introducing the dominant bit during transmission of the frame, the malicious actor may modify a bit of the frame and corrupt the message. If the message relates to a clock synchronization message, the malicious actor may modify a bit of the frame in a manner that initiates a delay attack (e.g., to delay delivery of the clock synchronization message and offset clock synchronization between the first node and the second node).

As further shown in FIG. 2A, and by reference number 206, the second node may discard the message due to an error. In some examples, the second node may discard the message due to an error indicated by a CRC field (e.g., a CRC value, such as a check sum value calculated by the first node) contained in the associated frame. For example, the second node may calculate a CRC value (e.g., a check sum value) of the frame of the received message, and compare the CRC value with the CRC value included in the CRC field to verify integrity of the message. Due to the bit that was modified by the malicious actor, the CRC value calculated by the second node may be different from the CRC value included in the CRC field provided by the first node. If the CRC value does not correspond to the CRC value included in the CRC field, the second node may determine that the message is corrupt and discard the message. If the message relates to a clock synchronization message, the second node may discard otherwise valid synchronization information (e.g., information relating to a transmit time and/or a timestamp of the message transmitted by the first node). In some examples, the message may relate to other types of information relating to function of a vehicle system. In such cases, the second node and/or other nodes of the communication bus may discard information needed to operate a time-sensitive and/or critical function of a vehicle.

As further shown in FIG. 2A, and by reference number 208, the malicious actor may replicate the message originally transmitted by the first node. For example, after corrupting the original message and causing the second node to discard the message, the malicious actor may initiate a replay attack (e.g., to replicate the unmodified frame corresponding to the original message, and transmit the replicated frame via the communication bus after a period of time). Additionally, or alternatively, the malicious actor may initiate an impersonation attack (e.g., to replicate an identifier field of the unmodified frame, and transmit the replicated frame via the communication bus falsely identifying the first node as the sender). Since the replicated frame does not contain the bit modified by the malicious actor, the second node may receive and improperly accept the replicated frame as a valid frame. If the replicated message relates to a clock synchronization message, the second node may synchronize an internal clock based on an inaccurate transmission delay (e.g., $Delay_{Attack}$ and $Delay_{X \to 2}$) rather than an actual transmission delay (e.g., $Delay_{1 \to 2}$) between the first node and the second node. If the replicated message relates to information relating to a function of a vehicle system, the second node and/or other nodes of the communication bus may improperly accept the replicated message as a valid message and inadvertently disrupt a vehicle function.

As further shown in FIG. 2A, and by reference number 210, the first node may identify an attack event based on the replicated message and the corresponding replicated frame. For example, the first node may observe the replicated frame replayed by the malicious actor via the communication bus, observe an identifier field of the replicated frame, and recognize that the identifier field falsely identifies the first node as the sender of the replicated frame. The first node may thereby determine that the replicated frame is a result of a delay attack, a replay attack, and/or an impersonation attack. In some examples, if the replicated message relates to a clock synchronization message, the first node may identify the attack event based on an inconsistency in a transmit time and/or a timestamp that may be included in a payload field of the associated frame. In some examples, the malicious actor may initiate a spoofing attack (e.g., to fabricate a message and transmit the fabricated message as a message transmitted by the first node). In such cases, the first node may similarly recognize the spoof attack via an identifier field of the associated frame. In some examples, the malicious actor may initiate an attack that is a combination of a delay attack, a replay attack, an impersonation attack, and/or a spoofing attack. Additionally, or alternatively, the second node and/or another node of the communication bus may recognize an inconsistency in an identifier field of a frame transmitted by the malicious actor and identify an attack event based on the inconsistency.

As shown in FIG. 2B, and by reference number 212, the first node may transmit a series of alert messages according to a shared secret to notify other nodes of the identified attack event. For example, the first node may evaluate and/or refer to a shared secret (e.g., a key, a code, a table, an index, a map, and/or another reference) that is shared between the first node, the second node, and/or another node of the communication bus (e.g., before commencing communication via the communication bus, during a communication setup process via a key exchange protocol, and/or the like). Based on the shared secret, the first node may determine a unique sequence of interframe transmit times (e.g., $T_1$, $T_2$, $T_3$, . . . , and $T_n$) for transmitting the alert messages. The sequence of interframe transmit times may specify transmit times of the alert messages, interval times between the alert messages, and/or another pattern for transmitting the alert messages. The sequence of interframe transmit times may correspond to a sequence of interframe arrival times that is recognizable by the second node and/or other nodes of the communication bus having access to the shared key. The sequence of interframe transmit times may permit the second node and/or other nodes receiving the series of alert messages to be notified of the attack event. As the sequence of interframe transmit times is determined based on the shared secret, the sequence of interframe transmit times may be undetectable by the malicious actor.

In some implementations, the shared secret may be universally shared between, and accessible to, nodes of the communication bus. In some examples, the shared secret may be distinct for different nodes or groups of nodes of the communication bus. If the shared secret is distinct for different nodes, the first node may identify the nodes to be notified of the attack event, evaluate the shared secret associated with those nodes, and determine the appropriate sequence of interframe transmit times to use based on the shared secret. In some examples, the shared secret may be fixed (e.g., set at manufacture time), periodically reset, and/or intermittently reset (e.g., per drive cycle in a vehicle system). Additionally, or alternatively, the first node may determine the sequence of interframe transmit times based on a shared secret and a freshness value. A freshness value may designate a duration threshold, a count threshold, and/or another threshold that determines a validity of the sequence of interframe transmit times. In some examples, the shared secret and/or the sequence of interframe transmit times may be reset and/or refreshed based on an expiration of the freshness value. The freshness value may thereby limit an ability of the malicious actor to learn the sequence of interframe transmit times, recognize future alert messages, disrupt future alert messages, replicate the alert messages, and/or otherwise maliciously respond to the alert messages.

In some implementations, the first node may transmit the series of alert messages irrespective of content. For example, the first node may generate a frame of an alert message without specific information contained in an identifier field, a payload field, and/or the like since a notification of the attack event may be communicated based on the sequence of interframe transmit times. In some cases, however, it may be possible for messages (e.g., messages that are not alert messages) to be inadvertently transmitted according to the sequence of interframe transmit times. In order to prevent a false notification of an attack event, the first node may generate the series of alert frames to include information signaling an attack event. For example, the first node may generate a frame of an alert message to include a dedicated alarm identifier (e.g., $ID_1$, $ID_2$, $ID_3$, . . . , and $ID_n$) in an identifier field of the frame as an additional indication of an attack event. In some examples, the dedicated alarm identifier may include a string of dominant bits (e.g., a string of logical "0" bits) configured to indicate the attack event while preventing tampering of the alert message by the malicious node. Additionally, or alternatively, the first node may include another type of dedicated alarm identifier in the identifier field, a payload field, and/or another field of the respective frames of the alert messages.

As further shown in FIG. 2B, and by reference number 214, the second node may be notified of the attack event based on the series of alert messages transmitted by the first node. For example, the second node may determine a reference sequence of interframe arrival times based on the shared secret that is shared between the first node, the second node, and/or another node of the communication bus. The second node may monitor a sequence of interframe arrival times (e.g., $T_1$, $T_2$, $T_3$, . . . , and $T_n$) of messages that are received via the communication bus, and identify a notification of an attack event if the sequence of interframe arrival times corresponds to the reference sequence of interframe arrival times. In some examples, such as when the shared secret is distinct for different nodes, the second node may identify the first node based on an identifier field included in a frame of an alert message, and evaluate the shared secret associated with the first node based on the identifier field. The second node may determine the appropriate reference sequence of interframe arrival times to use based on the shared secret. In some examples, the frames of the alert messages may include a dedicated alarm identifier (e.g., $ID_1$, $ID_2$, $ID_3$, . . . , and $ID_n$), as described above. In such cases, the second node may identify a notification of an attack event if the sequence of interframe arrival times corresponds to the reference sequence of interframe arrival times, and if the frames of the alert messages include the dedicated alarm identifier.

As shown in FIG. 2C, and by reference number 216, the first node or the second node may cause an action to be performed in connection with the attack event. In some examples, the second node may generate a record and/or a notification of the attack event. For example, the record and/or the notification may include information relating to an identification of the first node and/or another node transmitting the alert messages, an identification of the second node, an identification of the communication bus (e.g., in a system having multiple communication buses), an estimated time of the attack event, respective arrival times of the alert messages, a transmit time of the replicated message detected by the first node, and/or the like. In some examples, the second node may transmit the record and/or the notification to the first node, other nodes of the communication bus, and/or other nodes on another communication bus. The second node may transmit the record and/or the notification in a secured format (e.g., using a sequence of interframe transmit times according to a shared secret). In some examples, the second node may repeat the alert messages received from the first node for a threshold duration, a threshold count, and/or another threshold.

In some implementations, the second node may cause the communication bus, the first node, the second node, and/or another node of the communication bus to be temporarily disabled and/or limited in functionality in response to the attack event. For example, in a vehicle system, the second node may cause a vehicle to be operated in a limp mode, a safe mode, and/or another mode of operation configured to curtail and/or circumvent further attacks from a malicious actor. In some examples, the second node may cause the communication bus to be disabled, and cause a different communication bus to be enabled. For example, the second node may cause new messages being exchanged via the communication bus that is compromised by the malicious node to be forwarded to another available communication bus. In some examples, the second node may cause enhance security of the communication bus. For example, the second node may cause message authentication, encryption, and/or another supplemental security measure to be enabled. In some examples, the second node may cause the shared secret to be locked, restricted, reset, and/or modified. Additionally, or alternatively, the first node may cause one or more of the actions, described as being caused by the second node, to be performed upon detecting a replicated message, upon transmitting the alert messages, and/or upon receiving a notification of the attack event from the second node.

As indicated above, FIGS. 2A-2C are provided merely as examples. Other examples are possible and may differ from what was described with regard to FIGS. 2A-2C.

Figure 3A:
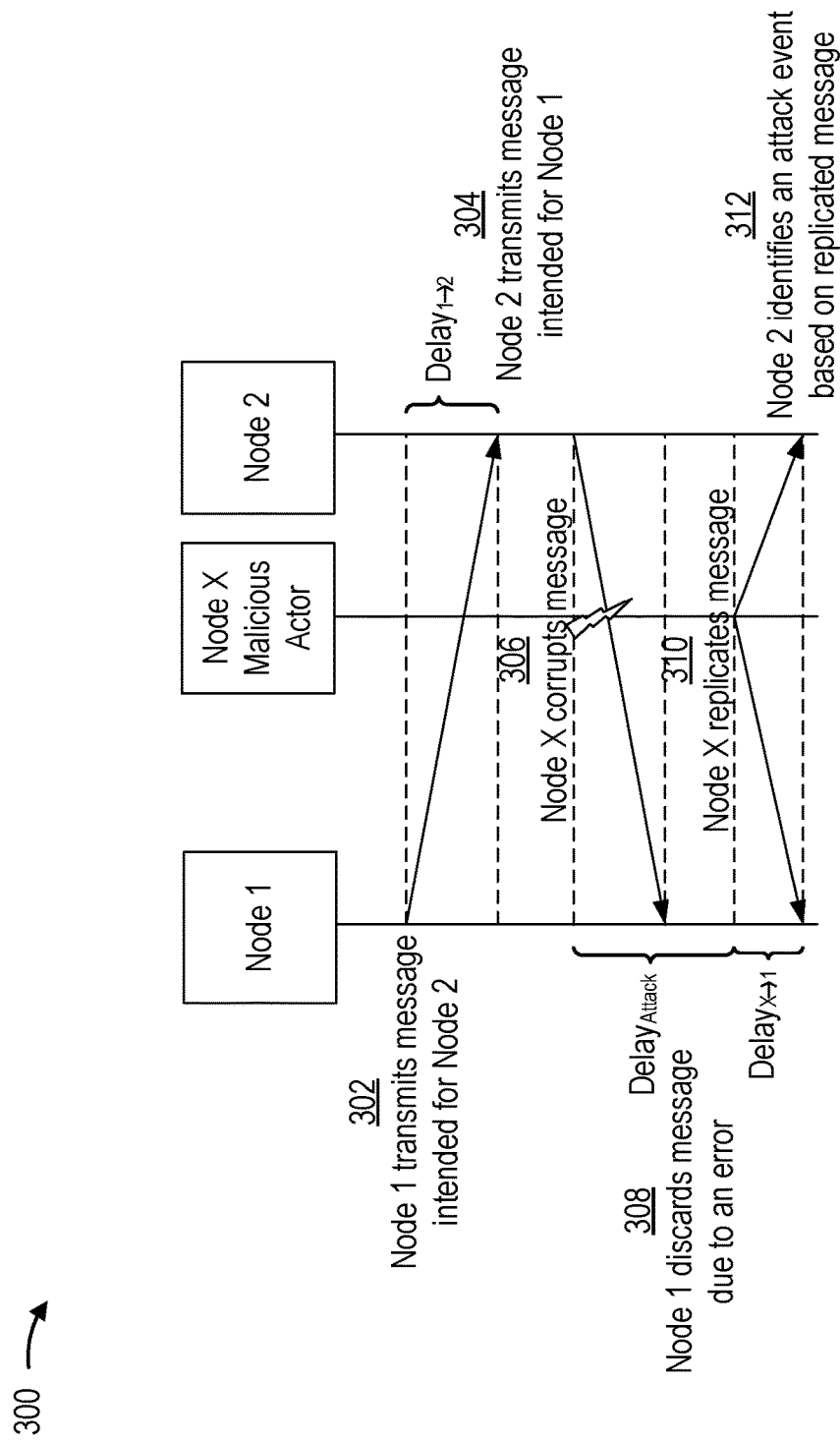
FIGS. 3A-3C are diagrams of an example implementation of an alert system described herein.
Figure 3B:
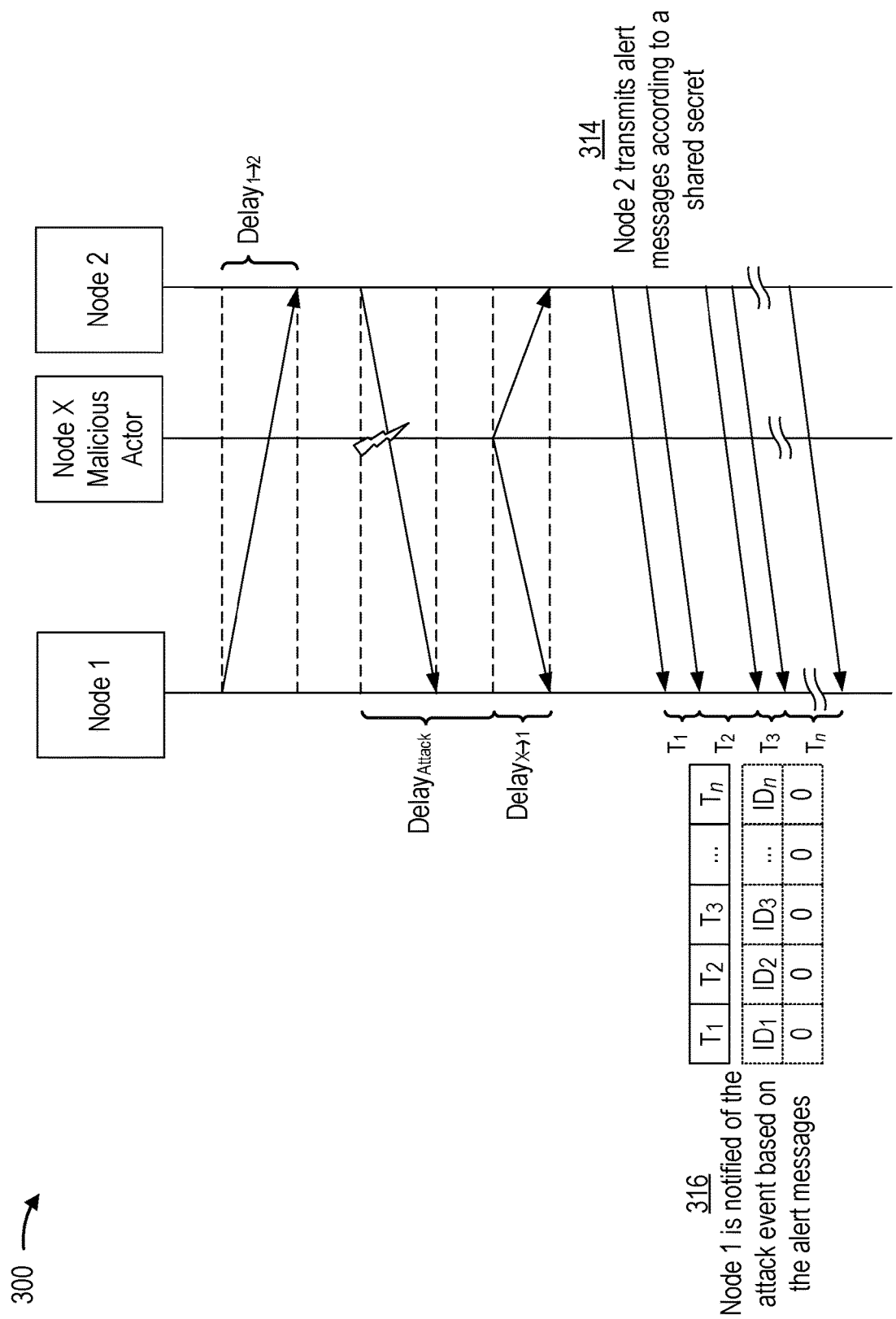
Figure 3C:
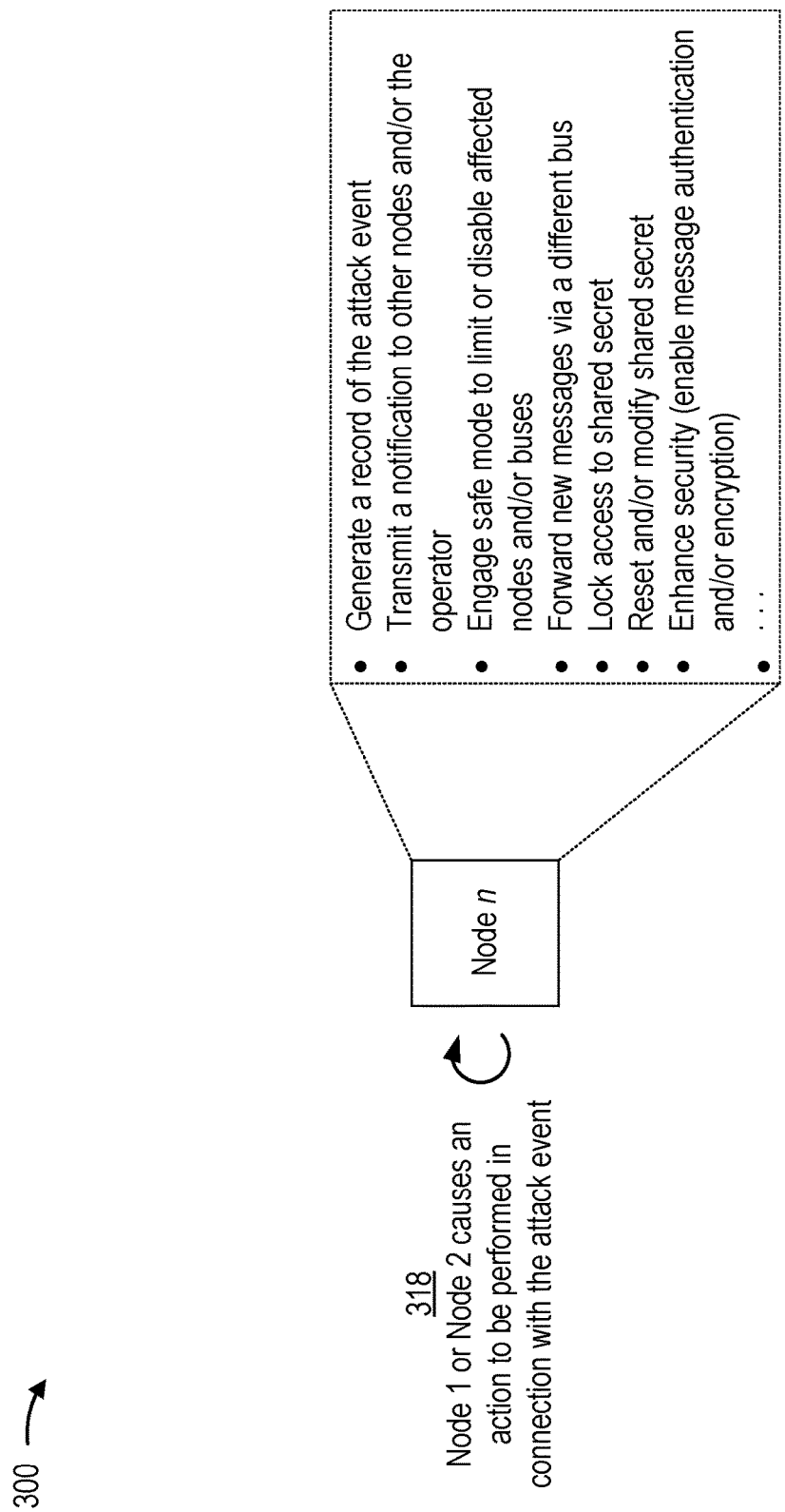

FIGS. 3A-3C are diagrams of an example implementation 300 of an alert system described herein. As shown in FIGS. 3A-3C, the example implementation(s) 300 may include a first node (e.g., Node 1) and a second node (e.g., Node 2) that are interconnected via a communication bus (e.g., a CAN bus). FIGS. 3A-3C present one or more functions that may be performed by the first node and/or the second node to identify an attack event initiated by a malicious actor (e.g., Node X) connected to the communication bus, and cause an action to curtail, circumvent, and/or otherwise address the attack event. In some examples, the first node and/or the second node may include a sensor, an actuator, a controller, and/or another device of an associated system. For example, the first node and/or the second node may perform an operation associated with a throttle function, a steering function, a braking function, a gear selection function, and/or another function of a vehicle system. In some examples, the first node and/or the second node may perform an operation associated with an industrial system, a medical system, a robotics system, and/or another CAN-based system. One or more of the functions, described as being performed by the first node, may be performed by the second node and/or another node of the communication bus, and one or more of the functions, described as being performed by the second node, may be performed by the first node and/or another node of the communication bus.

As shown in FIG. 3A, and by reference number 302, the first node may transmit first a message (e.g., a first frame of bits corresponding to the first message) intended for the second node via the communication bus. In some examples, the first message may be used to perform two-way clock synchronization with the second node. The first node may transmit a first frame having an identifier field with information identifying the first node and a payload field with information identifying a transmit time and/or a timestamp of the first frame. For example, the payload field may include information that can be used by the second node to determine a transmission delay (e.g., $Delay_{1 \to 2}$) between the first node and the second node, and synchronize an internal clock of the second node based on the transmission delay. In some examples, the first message may correspond to a request for other types of information (e.g., information relating to a throttle function, a steering function, a braking function, a gear selection function, and/or another function of a vehicle system). In such cases, the first frame may include an identifier field with information identifying the first node and the payload field with information identifying the request (e.g., a request for information provided via a sensor, information for controlling an actuator, an operating parameter, an operating condition, and/or the like).

As shown in FIG. 3A, and by reference number 304, the second node may transmit a second message intended for the first node via the communication bus. In some examples, the second message may be intended to complete two-way clock synchronization with the first node. The second node may transmit a second frame having an identifier field with information identifying the second node and a payload field with information identifying a transmit time and/or a timestamp of the second frame. For example, the payload field may include an arrival time of the first message transmitted by the first node, a transmission delay (e.g., $Delay_{1 \to 2}$) of the first message, a transmit time of the second message transmitted by the second node, and/or other information that can be used by the first node to determine a transmission delay of the second message. In some examples, the second message may correspond to another type of response to a request contained in the first message (e.g., information relating to a function of a vehicle system). In such cases, the second frame may include an identifier field with information identifying the second node and the payload field with information identifying content or information requested by the first node (e.g., information provided via a sensor, information for controlling an actuator, an operating parameter, an operating condition, and/or the like).

As further shown in FIG. 3A, and by reference number 306, a malicious actor may corrupt the second message transmitted by the second node and intended for the first node. For example, the malicious actor may gain control of an existing node of the communication bus or introduce an unauthorized node to the communication bus to gain access to messages being exchanged within the communication bus. Once connected to the communication bus, the malicious actor may attempt to override or otherwise disrupt an operation associated with the first node and/or the second node. For example, during transmission of the second frame (e.g., at a time that a node of the communication bus would not transmit bits per communication protocol), the malicious actor may introduce a dominant bit (e.g., a logical "0") into the communication bus (e.g., by driving a high bus terminal to 5 VDC and driving a low bus terminal to 0 VDC). By introducing the dominant bit during transmission of the second frame, the malicious actor may modify a bit of the second frame and corrupt the second message. If the second message relates to a clock synchronization message, the malicious actor may modify a bit of the second frame in a manner that initiates a delay attack (e.g., to delay delivery of the clock synchronization message and offset clock synchronization between the first node and the second node).

As further shown in FIG. 3A, and by reference number 308, the first node may discard the second message due to an error. In some examples, the first node may discard the second message due to an error indicated by a CRC field (e.g., a CRC value, such as a check sum value calculated by the second node) contained in the second frame. For example, the first node may calculate a CRC value (e.g., a check sum value) of the second frame, and compare the CRC value with the CRC value included in the CRC field to verify integrity of the second message. Due to the bit that was modified by the malicious actor, the CRC value calculated by the first node may be different from the CRC value included in the CRC field provided by the second node. If the CRC value does not correspond to the CRC value included in the CRC field, the first node may determine that the message is corrupt and discard the second message. If the second message relates to a clock synchronization message, the first node may discard otherwise valid synchronization information (e.g., information relating to a transmit time and/or a timestamp of the second message transmitted by the second node). In some examples, the second message may relate to other types of information relating to function of a vehicle system. In such cases, the first node and/or other nodes of the communication bus may discard information needed to operate a time-sensitive and/or critical function of a vehicle.

As further shown in FIG. 3A, and by reference number 310, the malicious actor may replicate the second message transmitted by the second node. For example, after corrupting the second message and causing the first node to discard the second message, the malicious actor may initiate a replay attack (e.g., to replicate the unmodified second frame, and transmit the replicated frame via the communication bus after a period of time). Additionally, or alternatively, the malicious actor may initiate an impersonation attack (e.g., to replicate an identifier field of the unmodified second frame, and transmit the replicated frame via the communication bus falsely identifying the second node as the sender). Since the replicated frame does not contain the bit modified by the malicious actor, the first node may receive and improperly accept the replicated frame as a valid frame. If the replicated message relates to a clock synchronization message, the first node may synchronize an internal clock based on an inaccurate transmission delay (e.g., $Delay_{Attack}$ and $Delay_{X \to 1}$) rather than an actual transmission delay (e.g., $Delay_{2 \to 1}$) between the second node and the first node. If the replicated message relates to information relating to a function of a vehicle system, the first node and/or other nodes of the communication bus may improperly accept the replicated message as a valid message and inadvertently disrupt a vehicle function.

As further shown in FIG. 3A, and by reference number 312, the second node may identify an attack event based on the replicated message and the corresponding replicated frame. For example, the second node may observe the replicated frame replayed by the malicious actor via the communication bus, observe an identifier field of the replicated frame, and recognize that the identifier field falsely identifies the second node as the sender of the replicated frame. The second node may thereby determine that the replicated frame is a result of a delay attack, a replay attack, and/or an impersonation attack. In some examples, if the replicated message relates to a clock synchronization message, the second node may identify the attack event based on an inconsistency in a transmit time and/or a timestamp that may be included in a payload field of the replicated frame. In some examples, the malicious actor may initiate a spoofing attack (e.g., to fabricate a message and transmit the fabricated message as a message transmitted by the second node). In such cases, the second node may similarly recognize the spoof attack via an identifier field of the associated frame. In some examples, the malicious actor may initiate an attack that is a combination of a delay attack, a replay attack, an impersonation attack, and/or a spoofing attack. Additionally, or alternatively, the first node and/or another node of the communication bus may recognize an inconsistency in an identifier field of a frame transmitted by the malicious actor and identify an attack event based on the inconsistency.

As shown in FIG. 3B, and by reference number 314, the second node may transmit a series of alert messages according to a shared secret to notify other nodes of the identified attack event. For example, the second node may evaluate and/or refer to a shared secret (e.g., a key, a code, a table, an index, a map, and/or another reference) that is shared between the first node, the second node, and/or another node of the communication bus. Based on the shared secret, the second node may determine a unique sequence of interframe transmit times (e.g., $T_1, T_2, T_3, \ldots,$ and $T_n$) for transmitting the alert messages. The sequence of interframe transmit times may specify transmit times of the alert messages, interval times between the alert messages, and/or another pattern for transmitting the alert messages. The sequence of interframe transmit times may correspond to a sequence of interframe arrival times that is recognizable by the first node and/or other nodes of the communication bus having access to the shared key. The sequence of interframe transmit times may permit the first node and/or other nodes receiving the series of alert messages to be notified of the attack event. As the sequence of interframe transmit times is determined based on the shared secret, the sequence of interframe transmit times may be undetectable by the malicious actor.

In some implementations, the shared secret may be universally shared between, and accessible to, nodes of the communication bus. In some examples, the shared secret may be distinct for different nodes or groups of nodes of the communication bus. If the shared secret is distinct for different nodes, the second node may identify the nodes to be notified of the attack event, evaluate the shared secret associated with those nodes, and determine the appropriate sequence of interframe transmit times to use based on the shared secret. In some examples, the shared secret may be fixed (e.g., se at manufacture time), periodically reset, and/or intermittently reset (e.g., per drive cycle in a vehicle system). Additionally, or alternatively, the second node may determine the sequence of interframe transmit times based on a shared secret and a freshness value. A freshness value may designate a duration threshold, a count threshold, and/or another threshold that determines a validity of the sequence of interframe transmit times. In some examples, the shared secret and/or the sequence of interframe transmit times may be reset and/or refreshed based on an expiration of the freshness value. The freshness value may thereby limit an ability of the malicious actor to learn the sequence of interframe transmit times, recognize future alert messages, disrupt future alert messages, replicate the alert messages, and/or otherwise maliciously respond to the alert messages.

In some implementations, the second node may transmit the series of alert messages irrespective of content. For example, the second node may generate a frame of an alert message without specific information contained in an identifier field, a payload field, and/or the like since a notification of the attack event may be communicated based on the sequence of interframe transmit times. In some cases, however, it may be possible for messages (e.g., messages that are not alert messages) to be inadvertently transmitted according to the sequence of interframe transmit times. In order to prevent a false notification of an attack event, the second node may generate the series of alert frames to include information signaling an attack event. For example, the second node may generate a frame of an alert message to include a dedicated alarm identifier (e.g., $ID_1, ID_2, ID_3, \ldots,$ and $ID_n$) in an identifier field of the frame as an additional indication of an attack event. In some examples, the dedicated alarm identifier may include a string of dominant bits (e.g., a string of logical "0" bits) configured to indicate the attack event while preventing tampering of the alert message by the malicious node. Additionally, or alternatively, the second node may include another type of dedicated alarm identifier in the identifier field, a payload field, and/or another field of the respective frames of the alert messages.

As further shown in FIG. 3B, and by reference number 316, the first node may be notified of the attack event based on the series of alert messages transmitted by the second node. For example, the first node may determine a reference sequence of interframe arrival times based on the shared secret that is shared between the first node, the second node, and/or another node of the communication bus. The first node may monitor a sequence of interframe arrival times (e.g., $T_1, T_2, T_3, \ldots,$ and $T_n$) of messages that are received via the communication bus, and identify a notification of an attack event if the sequence of interframe arrival times corresponds to the reference sequence of interframe arrival times. In some examples, such as when the shared secret is distinct for different nodes, the first node may identify the second node based on an identifier field included in a frame of an alert message, and evaluate the shared secret associated with the second node based on the identifier field. The first node may determine the appropriate reference sequence of interframe arrival times to use based on the shared secret. In some examples, the frames of the alert messages may include a dedicated alarm identifier (e.g., $ID_1, ID_2, ID_3, \ldots,$ and $ID_n$), as described above. In such cases, the first node may identify a notification of an attack event if the sequence of interframe arrival times corresponds to the reference sequence of interframe arrival times, and if the frames of the alert messages include the dedicated alarm identifier.

As shown in FIG. 3C, and by reference number 318, the first node or the second node may cause an action to be performed in connection with the attack event. In some examples, the first node may generate a record and/or a notification of the attack event. For example, the record and/or the notification may include information relating to an identification of the second node and/or another node transmitting the alert messages, an identification of the first node, an identification of the communication bus (e.g., in a system having multiple communication buses), an estimated time of the attack event, respective arrival times of the alert messages, a transmit time of the replicated message detected by the second node, and/or the like. In some examples, the first node may transmit the record and/or the notification to the second node, other nodes of the communication bus, and/or other nodes on another communication bus. The first node may transmit the record and/or the notification in a secured format (e.g., using a sequence of interframe transmit times according to a shared secret). In some examples, the first node may repeat the alert messages received from the second node for a threshold duration, a threshold count, and/or another threshold.

In some implementations, the first node may cause the communication bus, the first node, the second node, and/or another node of the communication bus to be temporarily disabled and/or limited in functionality in response to the attack event. For example, in a vehicle system, the first node may cause a vehicle to be operated in a limp mode, a safe mode, and/or another mode of operation configured to curtail and/or circumvent further attacks from a malicious actor. In some examples, the first node may cause the communication bus to be disabled, and cause a different communication bus to be enabled. For example, the first node may cause new messages being exchanged via the communication bus that is compromised by the malicious node to be forwarded to another available communication bus. In some examples, the first node may cause enhance security of the communication bus. For example, the first node may cause message authentication, encryption, and/or another supplemental security measure to be enabled. In some examples, the first node may cause the shared secret to be locked, restricted, reset, and/or modified. Additionally, or alternatively, the second node may cause one or more of the actions, described as being caused by the first node, to be performed upon detecting a replicated message, upon transmitting the alert messages, and/or upon receiving a notification of the attack event from the first node.

As indicated above, FIGS. 3A-3C are provided merely as examples. Other examples are possible and may differ from what was described with regard to FIGS. 3A-3C.

Figure 4:
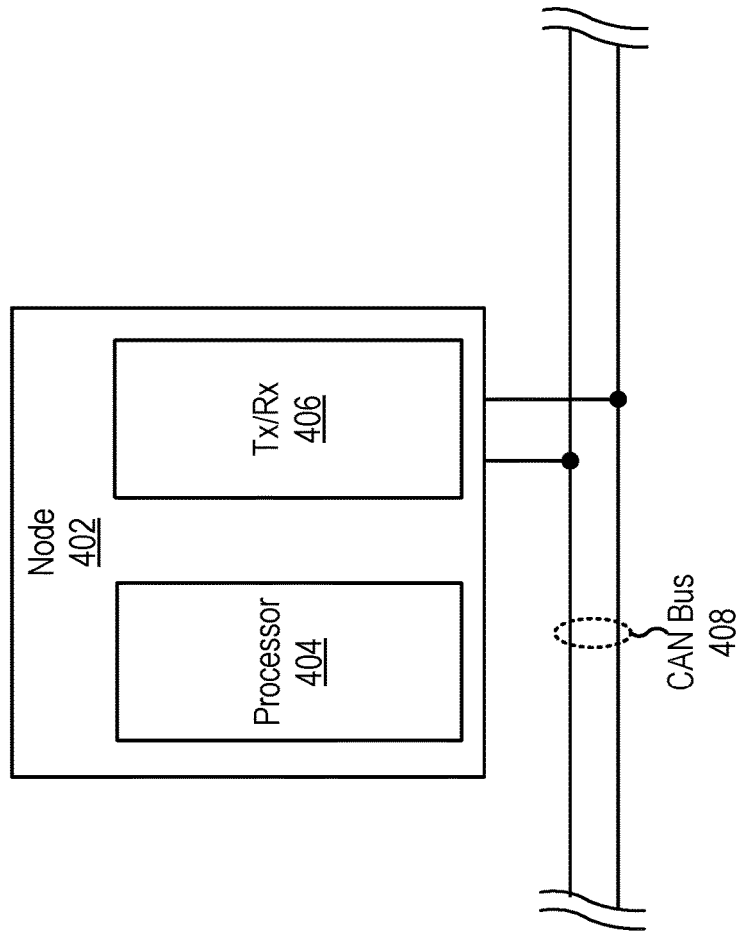
FIG. 4 is a diagram of an example environment in which systems and/or methods, described herein, may be implemented.

FIG. 4 is a diagram of an example environment 400 in which system and/or methods, described herein, may be implemented. As shown in FIG. 4, environment 400 may contain a node 402 including a processor 404 and a transceiver 406 (e.g., Tx/Rx) connected to a communication bus 408 (e.g., a CAN bus).

Node 402 includes one or more devices associated with controlling one or more electrical systems and/or electrical subsystems based, for example, on sensor data provided by sensors connected to node 402 via a sensor interface component of node 402 (not shown), control data for controlling actuators connected to node 402 via an actuator interface component of node (not shown), and/or the like. In a vehicle system, for example, node 402 may include an ECU, an ECM, a PCM, a TCM, a BCM, a CCM, a CTM, a GEM, a BCM, a SCM, or another type of electrical system or electrical subsystem of a vehicle.

Processor 404 includes a device (e.g., one or more integrated circuits) that operates as an embedded system for providing the control functionality associated with node 402. For example, processor 404 includes one or more central processing units (CPUs), memories, and/or programmable input/output (I/O) peripherals that allow processor 404 to operate as an embedded system. In some examples, processor 404 may send information to and/or receive information from transceiver 406.

Transceiver 406 includes a component via which node 402 may transmit and receive information. For example, transceiver 406 may include a differential line transceiver, or a similar type of component. In some examples, transceiver 406 includes a transmit (Tx) component that allows node 402 to transmit information (e.g., to another node) via communication bus 408, and/or a receive (Rx) component that allows node 402 to receive information (e.g., from another node that is similar to node 402) via communication bus 408. In some examples, transceiver 406 may include a line driver for enabling the Tx component (to transmit information) or the Rx component (to receive information) at a given time. In some examples, transceiver 406 may be a LIN transceiver, a CAN transceiver, a FlexRay transceiver, an Ethernet transceiver, or another type of transceiver associated with another type of communication bus system. In some examples, node 402 may include multiple transceivers 406 of different types.

Communication bus 408 includes a bus for carrying information from or to node 402. In some examples, communication bus 408 may comprise a connection (e.g., including one or more terminals, wires, and/or connectors) via which multiple nodes 402 are connected to one another. In some examples, communication bus 408 may include a set of connections, each associated with one or more node 402. In some examples, communication bus 408 may be a CAN bus, a CAN FD bus, a CAN XL bus, a CANopen bus, a LIN bus, a FlexRay bus, an Ethernet bus, and/or another type of bus. In some examples, each transceiver 406 of node 402 may be connected to an associated communication bus 408.

The number and arrangement of apparatuses shown in FIG. 4 is provided as an example. In practice, there may be additional devices and/or components, fewer devices and/or components, different devices and/or components, or differently arranged devices and/or components than those shown in FIG. 4. For example, in some implementations, environment 400 may include multiple node 402, each connected via one or more associated communication buses 408. Furthermore, two or more devices and/or components shown in FIG. 4 may be implemented within a single device and/or component, or a single device and/or a single component shown in FIG. 4 may be implemented as multiple, distributed devices and/or components. Additionally, or alternatively, a set of devices and/or components (e.g., one or more devices and/or components) of FIG. 4 may perform one or more functions described as being performed by another set of devices and/or components of FIG. 4.

Figure 5:
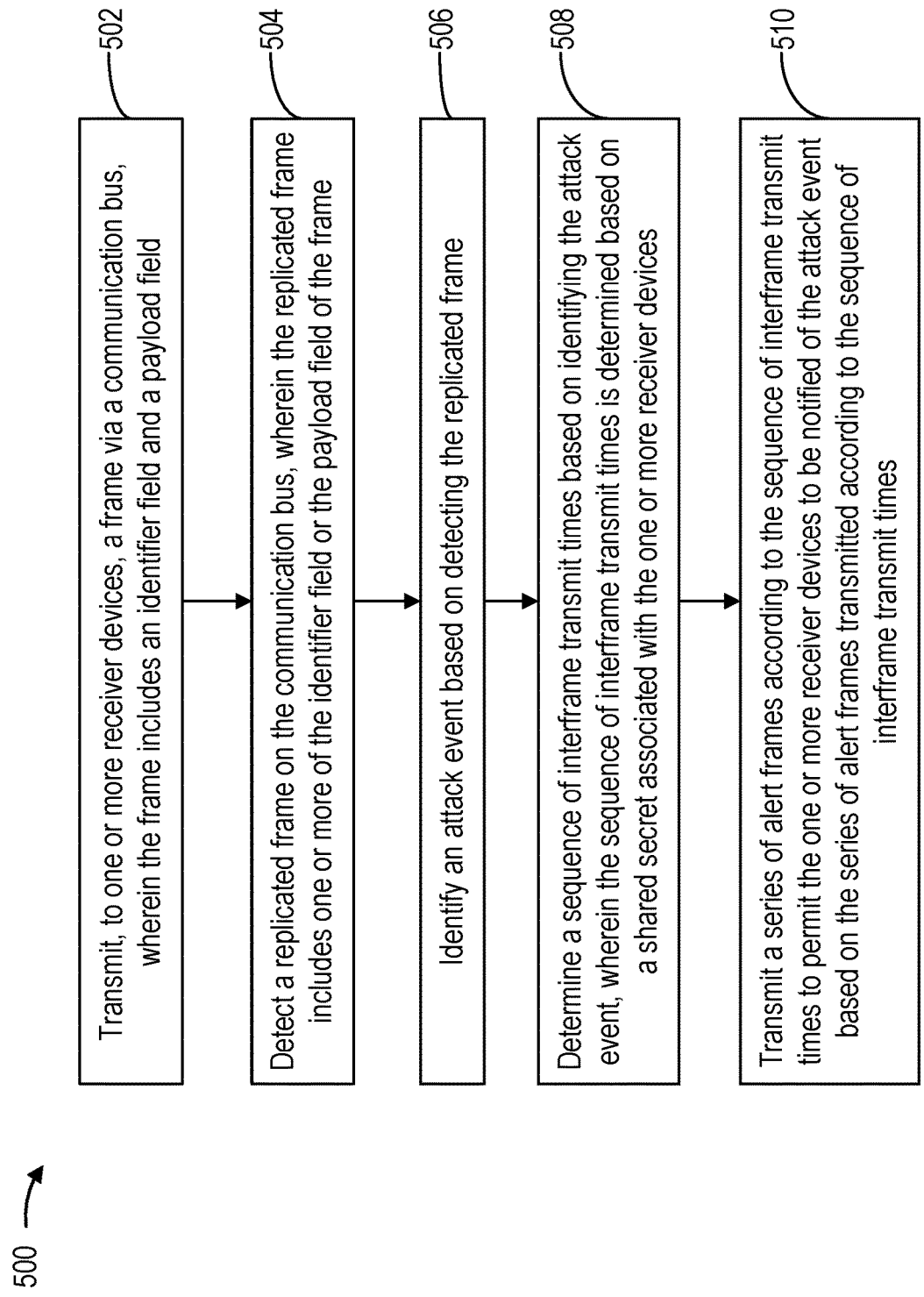
FIG. 5 is a flow chart of an example process for transmitting alert messages relating to an attack event within a communication bus.

FIG. 5 is a flow chart of an example process 500 for transmitting alert messages relating to an attack event within a communication bus. In some implementations, one or more process blocks of FIG. 5 may be performed by a node (e.g., node 402, a sender device, and/or the like) of a communication bus (e.g., a CAN bus). In some implementations, one or more process blocks of FIG. 5 may be performed by a single node, a set of nodes, or a subset of nodes of the communication bus.

As shown in FIG. 5, process 500 may include transmitting, to one or more receiver devices, a frame via a communication bus, wherein the frame includes an identifier field and a payload field (block 502). For example, the node (e.g., using processor 404, transceiver 406, and/or the like) may transmit, to one or more receiver devices, a frame via a communication bus, as described above. In some implementations, the frame may include an identifier field and a payload field.

As further shown in FIG. 5, process 500 may include detecting a replicated frame on the communication bus, wherein the replicated frame includes one or more of the identifier field or the payload field of the frame (block 504). For example, the node (e.g., using processor 404, transceiver 406, and/or the like) may detect a replicated frame on the communication bus, as described above. In some implementations, the replicated frame may include one or more of the identifier field or the payload field of the frame.

As further shown in FIG. 5, process 500 may include identifying an attack event based on detecting the replicated frame (block 506). For example, the node (e.g., using processor 404, transceiver 406, and/or the like) may identify an attack event based on detecting the replicated frame, as described above.

As further shown in FIG. 5, process 500 may include determining a sequence of interframe transmit times based on identifying the attack event, wherein the sequence of interframe transmit times is determined based on a shared secret associated with the one or more receiver devices (block 508). For example, the node (e.g., using processor 404, transceiver 406, and/or the like) may determine a sequence of interframe transmit times based on identifying the attack event, as described above. In some implementations, the sequence of interframe transmit times may be determined based on a shared secret associated with the one or more receiver devices.

As further shown in FIG. 5, process 500 may include transmitting a series of alert frames according to the sequence of interframe transmit times to permit the one or more receiver devices to be notified of the attack event based on the series of alert frames transmitted according to the sequence of interframe transmit times (block 510). For example, the node (e.g., using processor 404, transceiver 406, and/or the like) may transmit a series of alert frames according to the sequence of interframe transmit times to permit the one or more receiver devices to be notified of the attack event based on the series of alert frames transmitted according to the sequence of interframe transmit times, as described above.

Process 500 may include additional implementations, such as any single implementation or any combination of implementations described below and/or in connection with one or more other processes described elsewhere herein.

In a first implementation, detecting the replicated frame may comprise determining an identifier field of a subsequent frame on the communication bus transmitted by another node, and identifying the subsequent frame as the replicated frame based on determining that the identifier field of the subsequent frame corresponds to the node.

In a second implementation, alone or in combination with the first implementation, determining the sequence of interframe transmit times may comprise determining the sequence of interframe transmit times based on the shared secret and a freshness value.

In a third implementation, alone or in combination with one or more of the first and second implementations, process 500 may further comprise generating the alert frames to include respective identifier fields. In some implementations, the respective identifier fields may include a dedicated alarm identifier. In some implementations, the dedicated alarm identifier may include a string of dominant bits configured to indicate the attack event. In some implementations, transmitting the series of alert frames may comprise transmitting the series of alert frames according to the sequence of interframe transmit times and with the dedicated alarm identifier.

In a fourth implementation, alone or in combination with one or more of the first through third implementations, process 500 may further comprise generating a record or a notification of the attack event that includes information relating to an identification of the node, an identification of the one or more receiver devices, an identification of the communication bus, a transmit time of the replicated frame, or an estimated time of the attack event.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
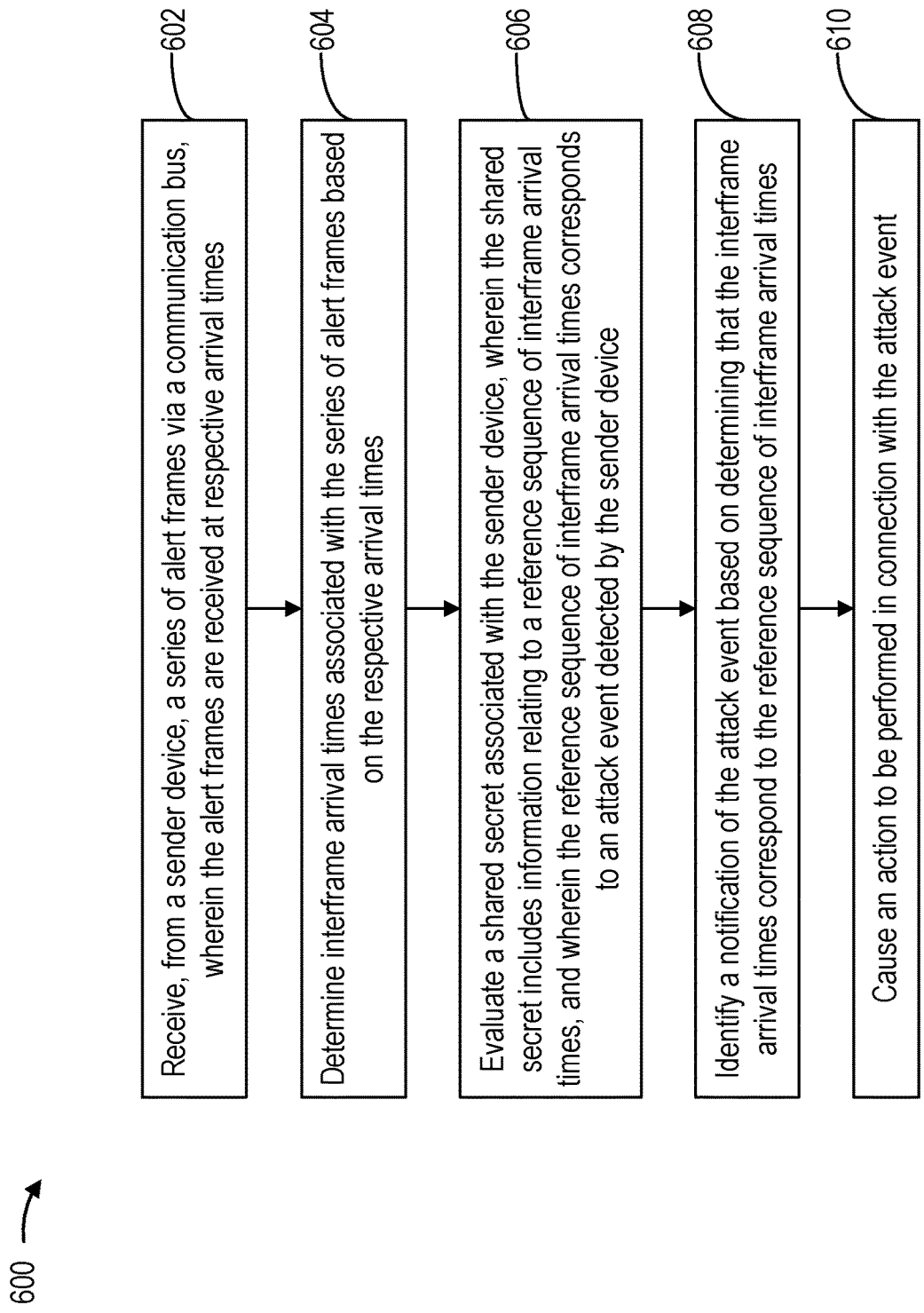
FIG. 6 is a flow chart of an example process for receiving a notification of an attack event within a communication bus.

FIG. 6 is a flow chart of an example process 600 for receiving a notification of an attack event within a communication bus. In some implementations, one or more process blocks of FIG. 6 may be performed by a node (e.g., node 402, a receiver device, and/or the like) of a communication bus (e.g., a CAN bus). In some implementations, one or more process blocks of FIG. 6 may be performed by a single node, a set of nodes, or a subset of nodes of the communication bus.

As shown in FIG. 6, process 600 may include receiving, from a sender device, a series of alert frames via a communication bus, wherein the alert frames are received at respective arrival times (block 602). For example, the node (e.g., using processor 404, transceiver 406, and/or the like) may receive, from a sender device, a series of alert frames via a communication bus, as described above. In some implementations, the alert frames may be received at respective arrival times.

As further shown in FIG. 6, process 600 may include determining interframe arrival times associated with the series of alert frames based on the respective arrival times (block 604). For example, the node (e.g., using processor 404, transceiver 406, and/or the like) may determine interframe arrival times associated with the series of alert frames based on the respective arrival times, as described above.

As further shown in FIG. 6, process 600 may include evaluating a shared secret associated with the sender device, wherein the shared secret includes information relating to a reference sequence of interframe arrival times, and wherein the reference sequence of interframe arrival times corresponds to an attack event detected by the sender device (block 606). For example, the node (e.g., using processor 404, transceiver 406, and/or the like) may evaluate a shared secret associated with the sender device, as described above. In some implementations, the shared secret may include information relating to a reference sequence of interframe arrival times. In some implementations, the reference sequence of interframe arrival times may correspond to an attack event detected by the sender device.

As further shown in FIG. 6, process 600 may include identifying a notification of the attack event based on determining that the interframe arrival times correspond to the reference sequence of interframe arrival times (block 608). For example, the node (e.g., using processor 404, transceiver 406, and/or the like) may identify a notification of the attack event based on determining that the interframe arrival times correspond to the reference sequence of interframe arrival times, as described above.

As further shown in FIG. 6, process 600 may include causing an action to be performed in connection with the attack event (block 610). For example, the node (e.g., using processor 404, transceiver 406, and/or the like) may cause an action to be performed in connection with the attack event, as described above.

Process 600 may include additional implementations, such as any single implementation or any combination of implementations described below and/or in connection with one or more other processes described elsewhere herein.

In a first implementation, determining the interframe arrival times may comprise determining intervals between the respective arrival times of the alert frames, and determining the interframe arrival times based on the intervals.

In a second implementation, alone or in combination with one or more of the first implementation, evaluating the shared secret may comprise identifying the sender device based on an identifier field included in one or more of the alert frames, and evaluating the shared secret associated with the sender device based on the identifier field.

In a third implementation, alone or in combination with one or more of the first and second implementations, the reference sequence of interframe arrival times may be associated with a freshness value. In some implementations, the reference sequence of interframe arrival times may be reset based on determining that the freshness value satisfies a freshness limit.

In a fourth implementation, alone or in combination with one or more of the first through third implementations, causing the action to be performed may comprise generating a record or a notification of the attack event that includes information relating to an identification of the sender device, an identification of the node, an identification of the communication bus, one or more of the respective arrival times of the series of alert frames, or an estimated time of the attack event detected by the sender device.

In a fifth implementation, alone or in combination with one or more of the first through fourth implementations, causing the action to be performed may comprise causing one or more of the node, the sender device, or the communication bus to be disabled.

In a sixth implementation, alone or in combination with one or more of the first through fifth implementations, causing the action to be performed may comprise causing the communication bus to be disabled, and causing a different communication bus to be enabled.

In a seventh implementation, alone or in combination with one or more of the first through sixth implementations, process 600 may further comprise determining an identifier field of one or more of the alert frames, comparing information included in the identifier field with a dedicated alarm identifier, and identifying the notification of the attack event further based on determining that the identifier field corresponds to the dedicated alarm identifier. In some implementations, the dedicated alarm identifier may include a string of dominant bits configured to indicate the attack event detected by the sender device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   transmitting, by a sender device and to one or more receiver devices, a frame via a controller area network (CAN) bus, wherein the frame includes an identifier field and a payload field;
   detecting, by the sender device and after transmitting the frame, a replicated frame on the CAN bus, wherein the replicated frame includes one or more of the identifier field or the payload field of the frame;
   identifying, by the sender device, an attack event based on the replicated frame; and
   transmitting, by the sender device, and based on identifying the attack event, a series of alert frames, which are transmitted according to a sequence of interframe transmit times determined based on a shared secret associated with the sender device,
   wherein transmitting the series of alert frames permits the one or more receiver devices to be notified of the attack event based on the sequence of interframe transmit times.

2. The method of claim 1, wherein detecting the replicated frame comprises:
   determining information in an identifier field of a subsequent frame on the CAN bus transmitted by another sender device; and
   identifying the subsequent frame as the replicated frame based on determining that the information in the identifier field of the subsequent frame corresponds to the sender device.

3. The method of claim 1, further comprising:
generating the series of alert frames to include respective identifier fields,
wherein the respective identifier fields include a dedicated alarm identifier, and
wherein the dedicated alarm identifier includes a string of dominant bits configured to indicate the attack event.

4. The method of claim 1, further comprising:
causing, based on identifying the attack event, access to the shared secret to be restricted from further access.

5. The method of claim 1, further comprising:
causing, based on identifying the attack event, the shared secret to be reset.

6. The method of claim 1, wherein further comprising:
causing, based on identifying the attack event, one or more of the one or more receiver devices, the sender device, or the CAN bus to be disabled.

7. The method of claim 1, further comprising:
causing, based on identifying the attack event, the CAN bus to be disabled; and
causing a different CAN bus to be enabled.

8. A sender device, comprising:
a transmitter; and
one or more processors configured to:
   transmit, to one or more receiver devices and using the transmitter, a frame via a communication bus, wherein the frame includes an identifier field and a payload field;
   detect a replicated frame on the communication bus, wherein the replicated frame includes one or more of the identifier field or the payload field of the frame;
   identify an attack event based on detecting the replicated frame;
   determine a sequence of interframe transmit times based on identifying the attack event, wherein the sequence of interframe transmit times is determined based on a shared secret associated with the one or more receiver devices; and
   transmit, using the transmitter, a series of alert frames according to the sequence of interframe transmit times to permit the one or more receiver devices to be notified of the attack event based on the series of alert frames transmitted according to the sequence of interframe transmit times.

9. The sender device of claim 8, wherein the one or more processors, when detecting the replicated frame, are configured to:
determine an identifier field of a subsequent frame on the communication bus transmitted by another sender device, and
identify the subsequent frame as the replicated frame based on determining that the identifier field of the subsequent frame corresponds to the sender device.

10. The sender device of claim 8, wherein the one or more processors, when determining the sequence of interframe transmit times, are configured to:
determine the sequence of interframe transmit times based on the shared secret and a freshness value.

11. The sender device of claim 8, wherein the one or more processors are further configured to generate the alert frames to include respective identifier fields,
wherein the respective identifier fields include a dedicated alarm identifier, and
wherein the dedicated alarm identifier includes a string of dominant bits configured to indicate the attack event; and
wherein the one or more processors, when transmitting the series of alert frames, are configured to transmit the series of alert frames according to the sequence of interframe transmit times and with the dedicated alarm identifier.

12. The sender device of claim 8, wherein the one or more processors are further configured to:
generate a record or a notification of the attack event that includes information relating to an identification of the sender device, an identification of the one or more receiver devices, an identification of the communication bus, a transmit time of the replicated frame, or an estimated time of the attack event.

13. A receiver device, comprising:
a receiver; and
one or more processors configured to:
   receive, from a sender device and using the receiver, a series of alert frames via a communication bus, wherein the alert frames are received at respective arrival times;
   determine interframe arrival times associated with the series of alert frames based on the respective arrival times;
   evaluate a shared secret associated with the sender device,
      wherein the shared secret includes information relating to a reference sequence of interframe arrival times, and
      wherein the reference sequence of interframe arrival times corresponds to an attack event detected by the sender device;
   identify a notification of the attack event based on determining that the interframe arrival times correspond to the reference sequence of interframe arrival times; and
   cause an action to be performed in connection with the attack event.

14. The receiver device of claim 13, wherein the one or more processors, when determining the interframe arrival times, are configured to:
determine intervals between the respective arrival times of the alert frames, and
determine the interframe arrival times based on the intervals.

15. The receiver device of claim 13, wherein the one or more processors, when evaluating the shared secret, are configured to:
identify the sender device based on an identifier field included in one or more of the alert frames, and
evaluate the shared secret associated with the sender device based on the identifier field.

16. The receiver device of claim 13, wherein the reference sequence of interframe arrival times is associated with a freshness value, and
wherein the reference sequence of interframe arrival times is reset based on determining that the freshness value satisfies a freshness limit.

17. The receiver device of claim 13, wherein the one or more processors, when causing the action to be performed, are configured to:
generate a record or a notification of the attack event that includes information relating to an identification of the sender device, an identification of the receiver device, an identification of the communication bus, one or more of the respective arrival times of the series of alert frames, or an estimated time of the attack event detected by the sender device.

18. The receiver device of claim 13, wherein the one or more processors, when causing the action to be performed, are configured to:
   cause one or more of the receiver device, the sender device, or the communication bus to be disabled.

19. The receiver device of claim 13, wherein the one or more processors, when causing the action to be performed, are configured to:
   cause the communication bus to be disabled, and
   cause a different communication bus to be enabled.

20. The receiver device of claim 13, wherein the one or more processors are further configured to:
   determine an identifier field of one or more of the alert frames,
   compare information included in the identifier field with a dedicated alarm identifier,
      wherein the dedicated alarm identifier includes a string of dominant bits configured to indicate the attack event detected by the sender device, and
   identify the notification of the attack event further based on determining that the identifier field corresponds to the dedicated alarm identifier.

\* \* \* \* \*